United States Patent [19]

Mortimer

[11] Patent Number: 5,699,713
[45] Date of Patent: Dec. 23, 1997

[54] BRAKE BOOSTER

[75] Inventor: Ivan Mortimer, Solihull, United Kingdom

[73] Assignee: Lucas Industries plc, England

[21] Appl. No.: 569,254

[22] PCT Filed: Jun. 29, 1994

[86] PCT No.: PCT/GB94/01408

§ 371 Date: Jun. 20, 1996

§ 102(e) Date: Jun. 20, 1996

[87] PCT Pub. No.: WO95/01272

PCT Pub. Date: Jan. 12, 1995

[30] Foreign Application Priority Data

Jul. 1, 1993 [GB] United Kingdom ............... 9313612

[51] Int. Cl.⁶ ............................................... F15B 9/10
[52] U.S. Cl. ................... 91/369.2; 91/369.3; 91/376 R
[58] Field of Search ........................ 91/369.1, 369.2, 91/369.3, 376 R

[56] References Cited

U.S. PATENT DOCUMENTS

| | | |
|---|---|---|
| 4,428,274 | 1/1984 | Takeuchi et al. ............ 91/369.2 |
| 4,690,034 | 9/1987 | Ando et al. |
| 5,012,723 | 5/1991 | Gauthier ..................... 91/369.2 |
| 5,146,837 | 9/1992 | Inoue ........................ 91/369.2 |
| 5,261,313 | 11/1993 | Yared ........................ 91/376 R |
| 5,367,942 | 11/1994 | Nell et al. ................. 91/376 R X |
| 5,425,302 | 6/1995 | Leurai et al. .............. 91/369.2 |

FOREIGN PATENT DOCUMENTS

0341101  11/1989  European Pat. Off. .
1560915  3/1969  France .

Primary Examiner—Hoang Nguyen
Attorney, Agent, or Firm—Andrus, Sceales, Starke & Sawall

[57] ABSTRACT

A brake booster having a fluid actuated piston in the form of a diaphragm (5) to which the supply of fluid is controlled by a valve mechanism (8A, 14A, 17), actuated by a driver-operated force input member (16) which acts via a reaction element (19) on an output member (10) providing power assisted input to a master cylinder. The booster includes a force transmission assembly (14,8) providing surfaces through which force is transmitted between the input and output members (16,10). A spring (24) is arranged to yield under a predetermined force to permit relative movement between parts (14) and (8) such as to change the ratio of the operative surface areas and thereby increase the boost ratio.

17 Claims, 7 Drawing Sheets

FIG 16 ns a valve control piston 14 which
5,699,713

1
BRAKE BOOSTER

BACKGROUND OF THE INVENTION

This invention relates to a brake booster, primarily for use in a vehicle hydraulic braking system for the purpose of providing power assistance in the actuation of a brake master cylinder, and of the general kind in which the supply of working fluid to a fluid-actuated servo piston is controlled by a valve mechanism actuated under the influence of a driver-operated force input member which acts via a reaction element on an output member arranged to provide power assisted input to the master cylinder.

A conventional brake booster of the aforesaid general kind provides a constant boost ratio throughout its operating range so that the boost increases progressively and rapidly with increased driver input, typically to a brake foot pedal. Whilst this provides satisfactory results in general use, it has become recognised that some drivers fail to exert enough force on the brake pedal during emergency braking, with the result that the available maximum deceleration of which a vehicle is capable without skidding is not always achieved.

SUMMARY OF THE INVENTION

An object of the present invention is to provide a brake booster of the aforesaid general kind which provides improved braking performance when relatively high levels of vehicle deceleration are required.

According to the invention, a brake booster of the aforesaid general kind includes a force transmission assembly providing surfaces through which force is transmitted between the input and output members, and yieldable means arranged to yield under a predetermined force to permit relative movement between parts of the force transmission assembly such as to change the ratio of the operative surface areas and thereby increase the boost ratio.

BRIEF DESCRIPTION OF THE DRAWINGS

The invention will now be described, by way of example, with reference to the accompanying drawings in which.

2
DETAILED DESCRIPTION OF THE PREFERRED EMBODIMENTS

Figures 1, 2:
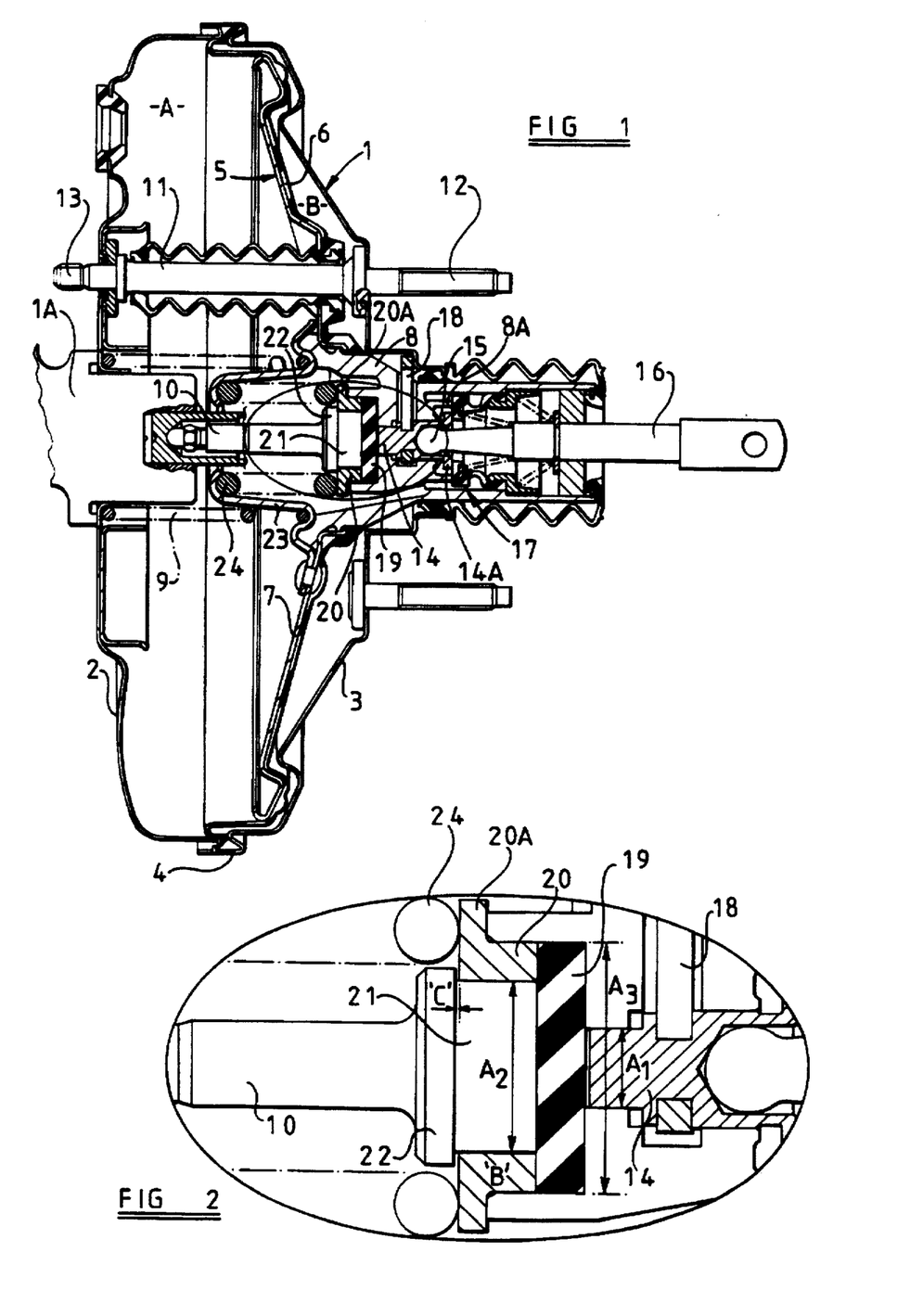
FIG. 1 is a longitudinal cross-section of one form of the brake servo booster of the invention.
FIG. 2 is an enlarged view, partly in cross-section, of the encircled area of FIG. 1.

The servo booster illustrated in FIGS. 1 and 2 of the drawings has a housing 1 which includes front and rear shells 2 and 3 joined together around their outer peripheries at 4 to form a closed unit. The interior of the housing is divided into two chambers A, B by a diaphragm assembly 5 which includes a flexible diaphragm 6 and a relatively rigid diaphragm support plate 7, the diaphragm 6 being trapped around its outer periphery at the joint 4 between the housing shells 2 and 3. The backing plate 7 is supported in its central region on an axially reciprocable hub 8 which extends therethrough and which is urged to the right, as seen in the drawing, by a coil return spring 9 acting between the hub and an internal surface portion of the shell 2. A force output rod 10 is carried by the hub and intended for connection, in use, to a piston of a master cylinder 1A forming part of a vehicle hydraulic braking system. A plurality of tie rods 11 extend axially through the housing 1 and, in addition to providing additional rigidity to the assembly, serve to mount the booster on a vehicle bulk head, for example, by way of rearwardly extending threaded end portions 12. Threaded end portions 13 at the opposite ends of the tie rods serve to secure the booster to the master cylinder, in conventional manner. The invention is equally applicable to alternative designs of booster which are not provided with tie rods.

The hub 8 also contains a valve control piston 14 which is allowed limited axial sliding movement within the hub and to which is crimped, or otherwise secured, a ball end 15 of a force input rod 16 connected, in use, to a driver-operated brake actuating pedal (not shown). The extreme right hand end portion of the piston 14 forms a valve seat 14A and the hub 8 forms a further valve seat 8A, both arranged to cooperate with a poppet valve assembly 17, in conventional manner. The piston 14 carries a radially extending abutment member in the form of a key 18, which abuts against the housing 1 in the illustrated rest position of the booster in order to determine the retracted position of the piston 14. A reaction disc 19 is interposed between the left hand side of the piston 14 and a collar 20 which surrounds an enlarged cylindrical part 21 of the output rod 10 and lies between the reaction disc 19 and an enlarged head 22 of the rod 10. A cage member 23 generally surrounds the output rod 10 and is secured to the backing plate 7 of the diaphragm assembly. Externally, the cage forms an abutment for one end of the return spring 9 and also contains a further spring 24 surrounding the rod 10 and acting between an internal surface of the cage 23 and a facing surface of a flange 20A of the collar 20.

When the booster is operated by a driver applying an input force via a brake pedal to the rod 16, the booster is activated to produce power assistance to the master cylinder by action of the valve seats 14A and 8A, in conventional manner. Initially, the booster chambers A and B are held in a state of balance, power assistance being provided by allowing atmospheric air to reach the rear chamber B in order to urge the diaphragm assembly 5 and hub 8 in a direction towards the master cylinder.

As long as the brake actuating force applied by the driver at the rod 16 remains within a range required for normal braking, this force is applied via the piston 14 to the reaction disc 19 which, by resilient deformation, acts upon the enlarged portion 21 of the output rod 10. Under these conditions, the boost ratio is the ratio of the cross-sectional area A1 of the abutting part of the piston 14 to the cross-sectional area A2 of the rod portion 21 i.e. a boost ratio of A2:A1. During normal braking, the spring 24 is able to resist the input force without yielding and maintains a clearance C between the forward face of the collar 20 and the opposing annular face of the head 22. When the input force is increased beyond that required for normal braking, as, for example, during an emergency stop, the pressure of the reaction disc increases until it is sufficient to overcome the pre-load of the spring 24 which yields, permitting the collar 20 to take up the clearance C and engage the head 22. The effective output area is now that area A3 of the collar 20 in engagement with the reaction disc 19 and the boost ratio under these conditions is A3:A1. This increases the available braking force, providing the possibility for increased deceleration, depending upon the nature of the surface upon which the vehicle is running.

Figure 3:
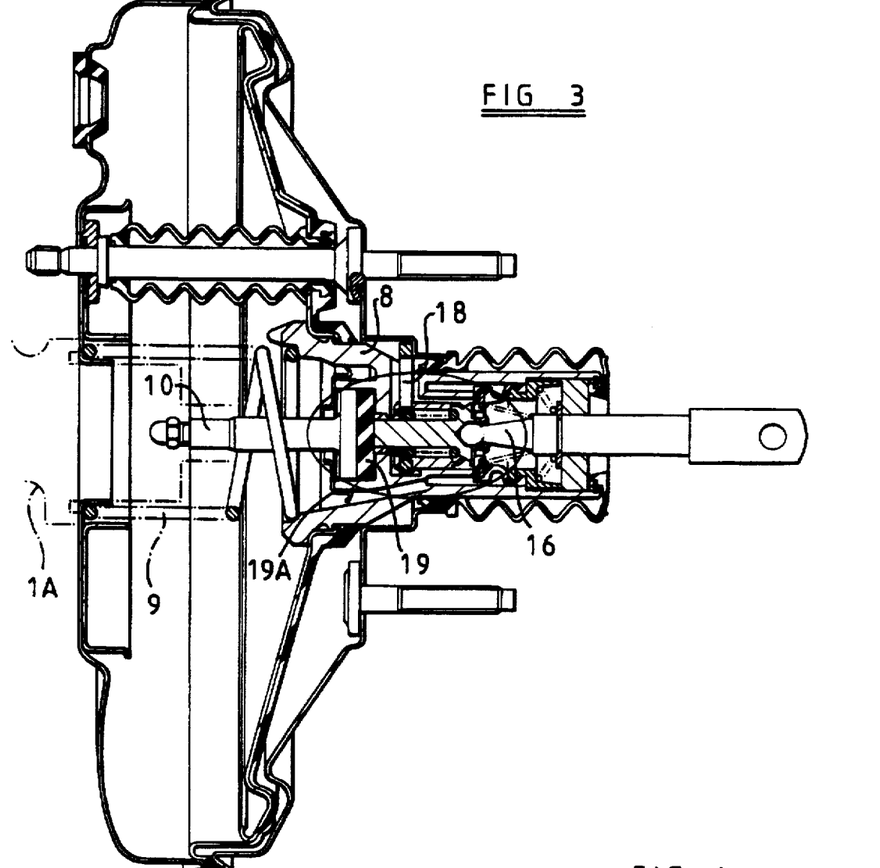
FIGS. 3 and 4 are views similar to FIGS. 1 and 2, illustrating an alternative form of the booster of the invention.
Figure 4:
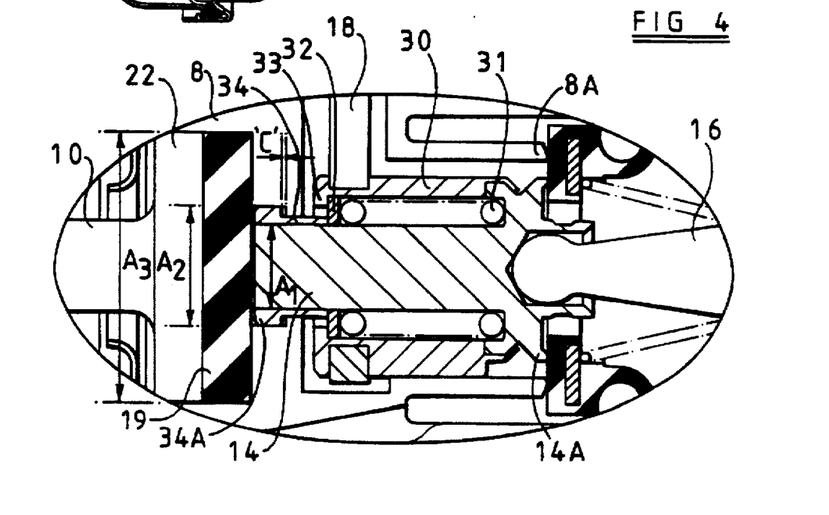

In the alternative embodiment illustrated in FIGS. 3 and 4, the return spring 9 acts directly on the hub 8 and the output rod 10 and reaction disc 19 are retained in position by a cage 19A of thin gauge metal or plastics material. As can be seen more clearly from FIG. 4, the valve control piston 14 engaged by the force input rod 16 is surrounded by a sleeve 30 which is rigidly secured to the piston 14 and contains a spring 31 surrounding the piston and bearing at one end against the piston itself and at its other end against an abutment ring or circlip 32 engaged against an inwardly directed end flange 33 of the sleeve. A collar 34 slidably mounted within the hub 8 and closely surrounding the piston 14 has its inner end in engagement with the ring 32 and a shoulder formed by an enlarged portion 34A of the collar is spaced by a distance C from an adjacent surface of the hub 8. The key 18, which sets the retracted position of the piston 14 by engagement with the booster housing, is again carried by the sleeve 30.

Upon application of input force to the rod 16, the spring 31 remains unyielding under input loads required for normal vehicle deceleration and the control piston 14 and sleeve 30 move forward as a unit, pushing with them the collar 34 so that the reaction disc 19 is engaged by the combined surface areas of the piston 14 and the enlarged collar portion 34 providing an input area A2. The force is applied via the reaction disc to the head 22 of the output rod 10, the head having an area A3 giving a boost ratio of A3:A2 for normal braking. At a predetermined input load, the pressure of the reaction disc on the sleeve 30 overcomes the force of the spring 31, enabling the sleeve to move to the right, as seen in the drawing, to take up clearance C and effectively become 'earthed' against the hub, leaving the input force to be transmitted to the reaction disc over the end area A1 of the control piston 14. For heavy braking, therefore, the boost ratio changes to A3:A1. It will be seen that, with this embodiment, the ratio change takes place on the input side, as distinct from on the output side, as in the embodiment of FIGS. 1 and 2.

Figure 5:
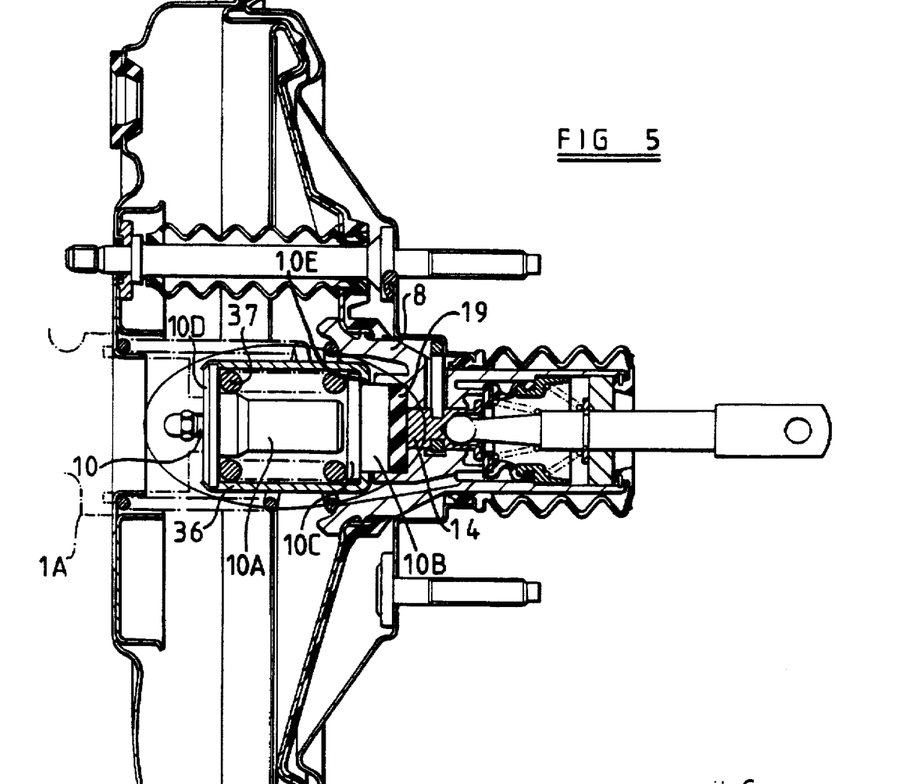
FIGS. 5 and 6 are views similar to FIGS. 1 and 2 illustrating a further alternative form of the booster of the invention.
Figure 6:
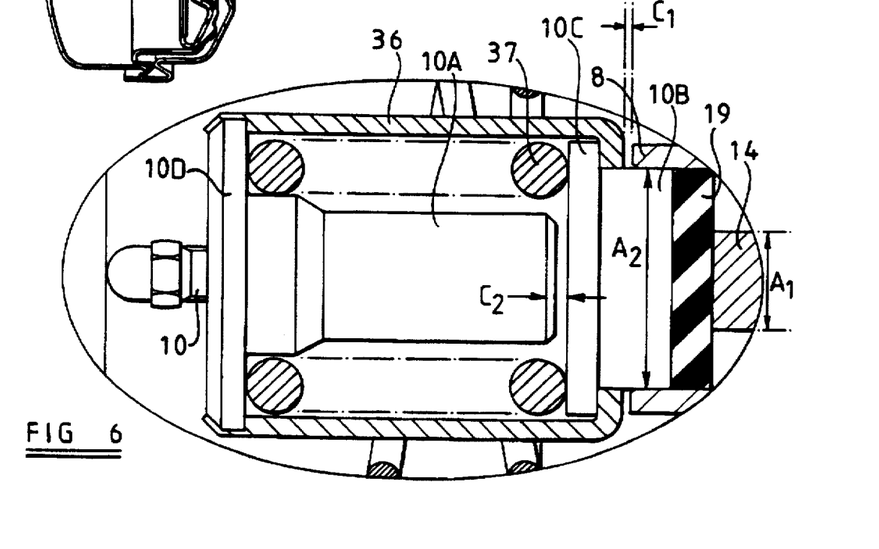

In the embodiment described in FIGS. 5 and 6, the general booster construction remains similar to those described previously, except that the output rod 10 forms part of a two-part output assembly. The first part consists of a larger diameter rod portion 10A integral with the rod 10, and a separate member 10B of larger diameter than the portion 10A, one end face of which abuts the reaction disc 19. The rod part 10A is housed within a sleeve 36 and the member 10B extends outwardly of the cage but is trapped therein by way of an enlarged flange 10C thereof abutting the adjacent inwardly turned portion 10E of the cage. The other end of the cage is rendered captive with an enlarged flange 10D of the rod portion 10A. A spring 37 surrounding the rod portion 10A is housed within the sleeve 36, bearing at one end against the flange 10C of the rod portion 10B and at its other end against the flange 10D of the rod portion 10A.

Again, the operation of this embodiment of the booster is generally similar to that previously described. For normal input loads, the valve control piston 14 engages the reaction disc 19 over the end area A1 of the piston, the reaction disc engaging the output rod portion 10B over an area A2, giving an initial boost ratio of A2:A1. When a predetermined input force is reached, the spring 37 yields to permit the hub 8 to move forward and take up the clearance C1 between its forward end and the adjacent surface of the sleeve 36. When this happens, no further feedback is transmitted through the reaction disc 19 to the control piston 14, which means that the boost ratio is then infinity. The clearance C2 between the enlarged flange 10C and the adjacent end of the rod portion 10A is greater than clearance C1, ensuring that abutment does not occur between the aforesaid parts 10C and 10A.

Figures 7, 8:
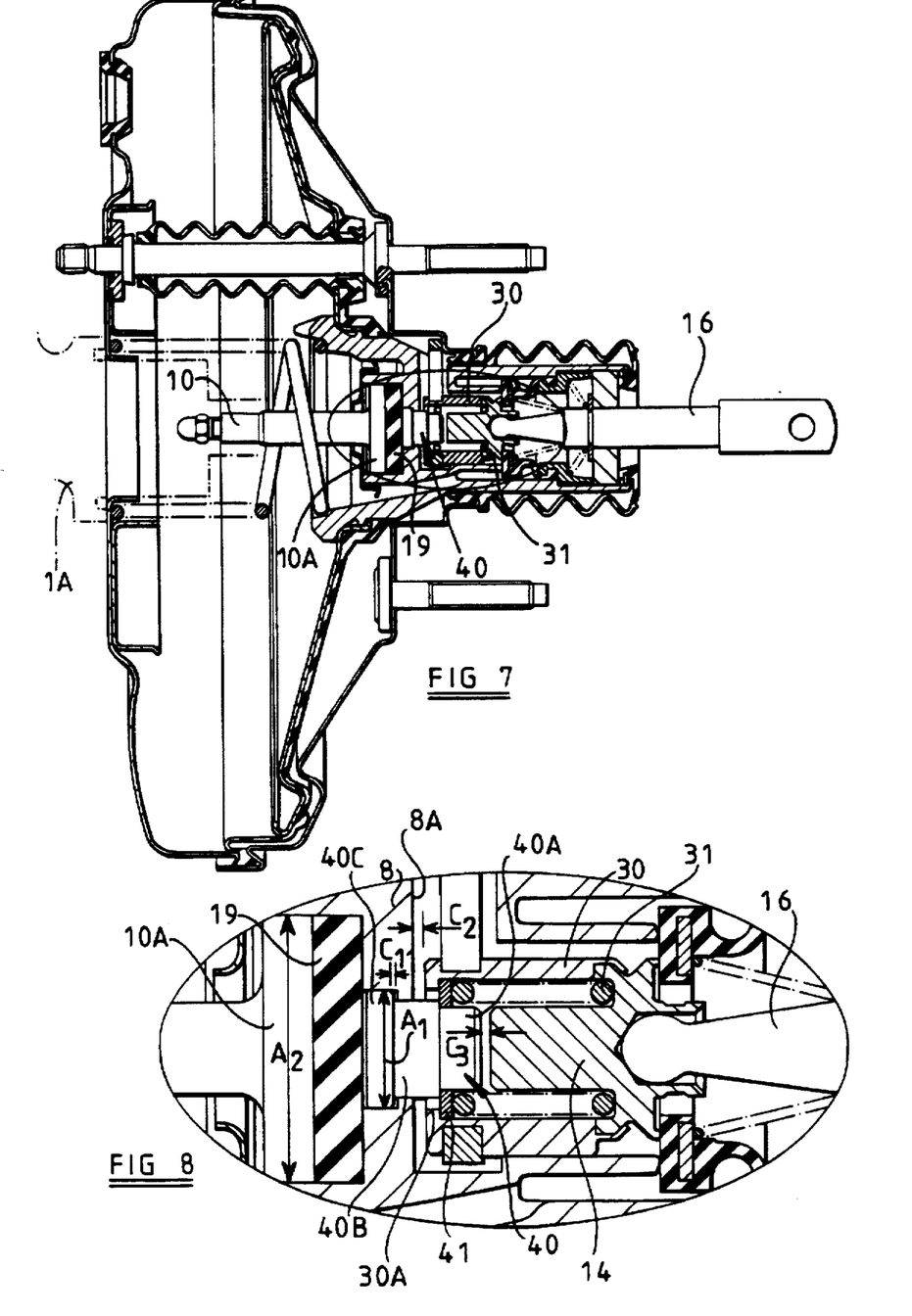
FIGS. 7 and 8 are views similar to FIGS. 1 and 2 illustrating a further alternative form of the booster of the invention.

The embodiment of FIGS. 7 and 8 is similar to that of FIGS. 3 and 4, with the exception that the input member is split into two parts. A first part 14 constituting the valve control piston again lies within a sleeve 30, which also houses a spring 31 surrounding the piston 14. The piston is foreshortened in this embodiment, and a second part of the output member is constituted by a plunger 40 of which a smaller diameter end portion 40A is housed within the sleeve 30. A portion 40B of intermediate diameter is slidably mounted within the hub 8. A shoulder formed between the portions 40A and 40B engages an abutment washer or circlip 41 abutting an inwardly directed end flange 30A of the sleeve and engaged by the spring 31 within the sleeve. A larger diameter portion 40C lies within the hub adjacent the reaction disc 19 and is spaced at its side remote from the disc by a distance C1 from a facing surface of the hub. It will also be noted that the sleeve 30 is spaced by a distance C2 from a facing surface 8A of the hub 8 and that there is a spacing C3 between the portions 40 and 14 of the input member.

Initial inward movement of the force input rod 16 moves the valve piston and caged spring assembly as a unit, so that input force is fed via the washer 41 and the stepped member 40 to the reaction disc over the area A1 of the large diameter portion 40C of the member 40. The reaction disc is in engagement with a head 10A of the output rod 10, the area of the head being A2, providing a boost ratio of A2:A1. Rearward movement of the reaction disc acting on the area A1 will move the member 40 in the reverse direction, closing the gap C1 between the head 40C and the hub 8 to earth the plunger 40, enabling the increasing input force to overcome the force of the spring 31 and allow the sleeve 30 to move so as to take up the clearance C2 and thereby abut the hub 8. This results in direct actuation of the booster with an infinite boost ratio. The gap C3 between the portions of the input member is greater than either of the gaps C1 and C2, ensuring a slight gap is always maintained between these components.

Figures 9, 10:
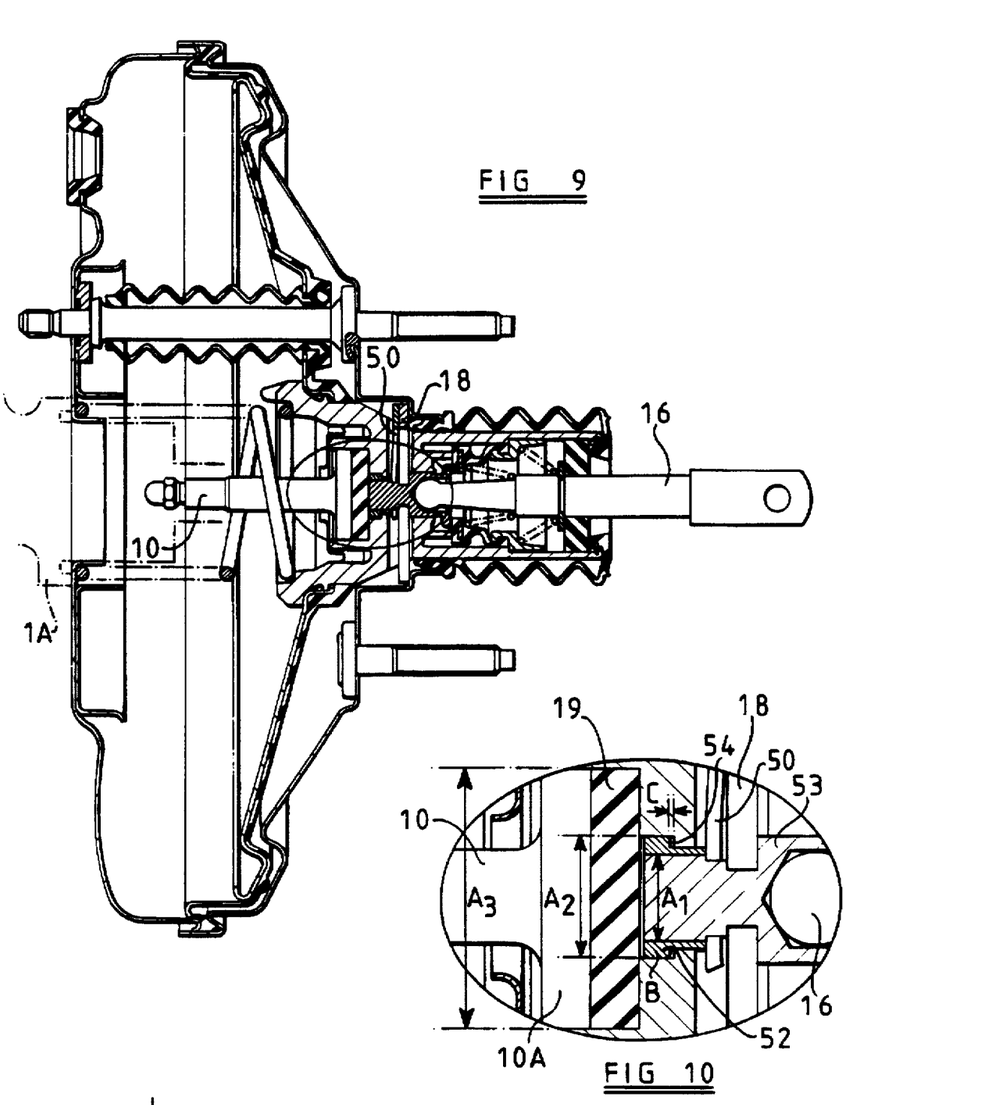
FIGS. 9 and 10 are views similar to FIGS. 1 and 2 illustrating a further alternative embodiment of the booster of the invention.
Figure 11:
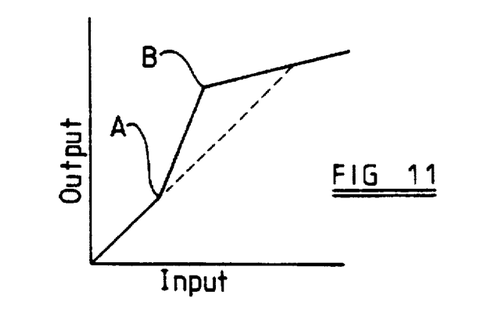
FIG. 11 is a graph illustrating an operational function of the booster of FIGS. 9 and 10.

The embodiment of FIGS. 9 and 10 is similar in most respects to that of FIG. 3, except that the caged spring of the previous embodiment is replaced by a cantilever blade spring 50 attached to the key 18 which sets the non-operative position of the hub. As can be seen more clearly from FIG. 10 a collar 52 is mounted around the valve control piston 53 with a rearward facing shoulder 54 spaced from the facing surface of the hub by a distance C. Initially, input force applied via the input rod 16 to the control piston 53 moves the control piston and collar 52 forward as a unit which contacts the reaction disc 19 over an area A2. The forward face of the reaction disc contacts an adjacent enlarged head 10A of the output rod 10 over an area A3, giving an initial boost ratio of A3:A2. When the force fed back by the reaction member to the collar 52 is sufficient to collapse the spring 50, the gap C is taken up, earthing the collar 52, and the input force will now be applied to the reaction member over the area A1 of the control piston 53, giving a boost ratio of A3:A1 for higher deceleration braking. It will be seen that replacement of the caged spring with the blade spring 50 results in considerable foreshortening of the valve control piston, leading to a more compact, as well as simpler, arrangement. The output force achieved in relation to a given input force is illustrated by the graph of FIG. 11, in which the change in boost ratio occurs at point A and B represents the maximum boost or "knee" point of the graph.

Figures 12, 13, 14:
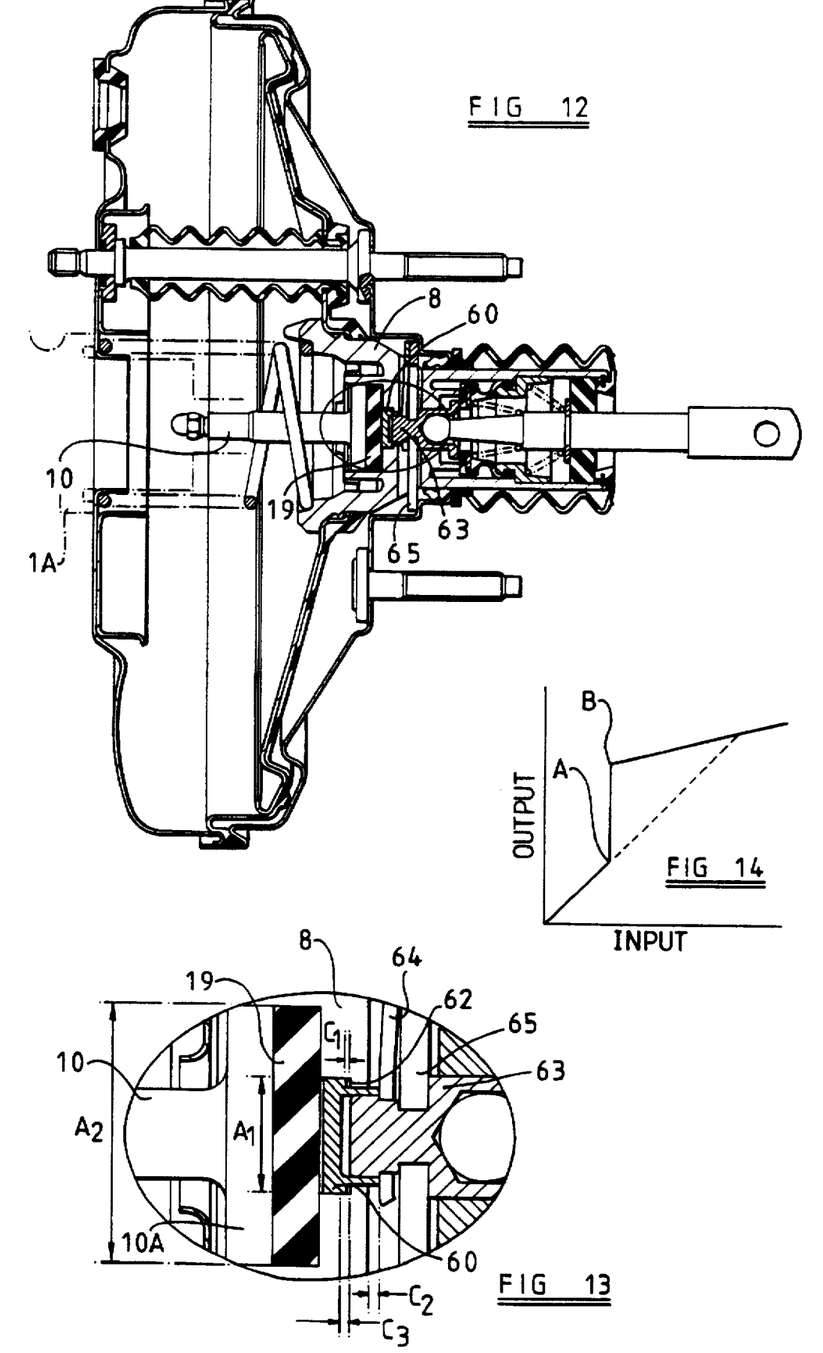
FIGS. 12 and 13 are views similar to FIGS. 1 and 2 illustrating a further alternative embodiment of the booster of the invention.
FIG. 14 is a graph illustrating an operational function of the booster of FIGS. 12 and 13, and FIGS. 15 and 16 are respectively similar views of parts of two further alternative embodiments of the booster of the invention.

The embodiment of FIGS. 12 and 13 is generally similar to that of FIGS. 9 and 10, but employs a closed-ended collar 60 slidably mounted within the hub 8 and arranged so that the whole of its forward surface area A1 may engage the reaction disc 19. A rearward facing shoulder 62 of the collar 60 is spaced by a distance C1 from an opposing face of the hub. The control piston 63 is slidably mounted within the collar 60 and engaged by a blade spring 64 carried by the abutment key 65, as before. Application of braking force under normal conditions causes the control piston 63 and collar 60 to move as a unit so that input force is applied to the reaction disc 19 over the area A1. The forward face of the reaction disc contacts an adjacent enlarged head 10A of the output rod 10 over an area A2, and the boost ratio at this stage is the ratio of the area of the reaction disc to that of the abutting area of the collar i.e. A2:A1. Increasing braking force will cause the force applied by the reaction disc to the collar 60 to take up the clearance C1 and subsequent collapse of the spring enables the valve piston to move further forward until the spring abuts the hub 8, at which point the boost ratio becomes infinity. FIG. 14 illustrates the initial output for normal braking and the change A to an infinite boost ratio, with the "knee" point at B.

Figure 15:
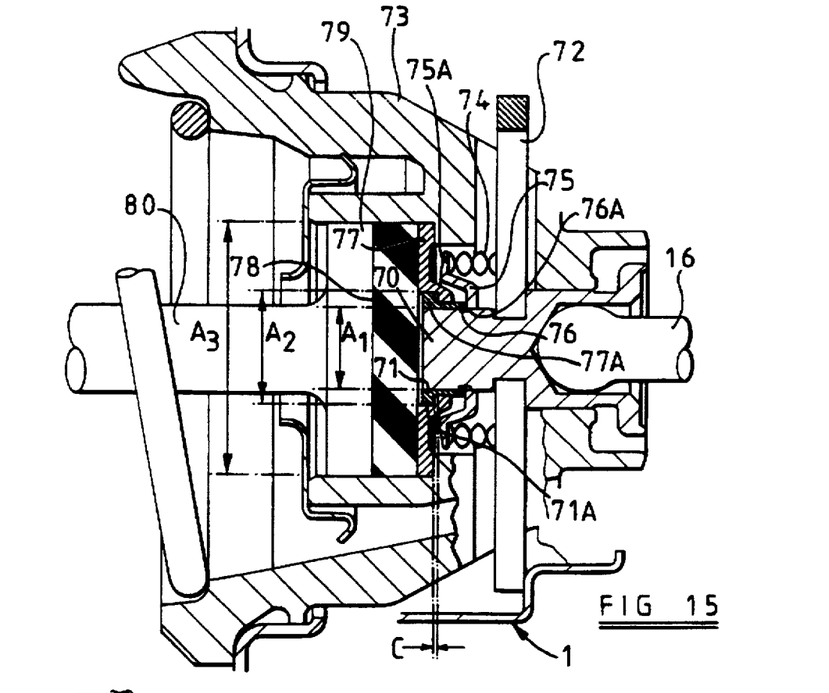

In the further alternative embodiment of FIG. 15, the valve control piston 70 again carries a surrounding sleeve 71 and a key 72 which sets the illustrated non-operative position of the hub 73 by abutment against the housing, as previously. A spring 74 acts between the front face of the key 72 and an opposing face of a flange 75A of a cup member 75 surrounding and carried by the piston 70. A circlip or the like 76 housed in a peripheral axially elongate groove 76A of the piston is engaged at one side by an end of the sleeve 71 and at its other side by the cup member 75. A collar 77 housed closely within the hub 73 has a rearwardly extending flange 77A which, with the booster in its illustrated non-operative condition, is spaced by a distance 'C' from the rear face of an adjacent flange 71A of the sleeve 71. The front face of the collar 77 engages a reaction disc 78 engaged, in turn, with an enlarged head 79 of a force output rod 80.

When an input force is applied via the input rod 16 to the control piston 70, the assembly consisting of the piston 70, key 72, sleeve 71 and, under the action of the, as yet, unyielding spring 74, the cup member 75 move forward as a unit, acting on the reaction disc over the area A2, being the combined areas of the end of the piston 70 and of the sleeve 71. The forward face of the reaction disc contacts the head 79 of the output rod over an area A3, giving an initial boost ratio of A2:A3. When the reaction force of the disc 78 is sufficient to cause yielding of the spring 74, the sleeve 71 pushes the circlip along the groove 76A and thereby moves rearwardly to take up the clearance 'C', and becomes earthed against the hub, via the collar 77, leaving the input force applied over the end area A1 of the piston 70, the boost ratio now being A1:A3, facilitating higher deceleration braking.

Figure 16:
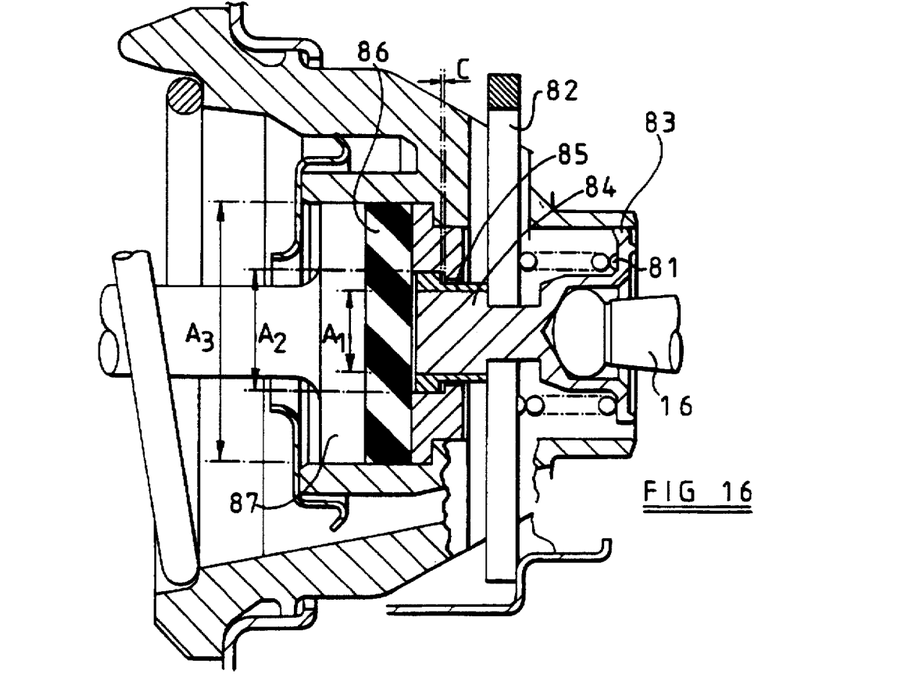

FIG. 16 illustrates a further embodiment in which the yieldable means, in the form of a coil spring 81 acts on an abutment key 82 similar to that of the previous embodiment, the spring, in this arrangement, acting between the rear face of the key and a radial flange 83 formed at the rear end of the valve control piston 84. In operation, input force applied to the rod 16 moves the piston 84, and via the spring 81, the key 82 and the sleeve 85 together so that the reaction disc 86 is engaged by the combined area A2 of the forward ends of the piston 84 and sleeve 85, giving an initial boost ratio of A2:A3, where A3 is the area of the head 87 of the output rod engaged by the forward face of the reaction disc. When a predetermined high braking load is reached, rearward movement of the reaction disc acting on the combined area A2 will cause yielding of the spring 81 to take up the clearance C, leaving the input force to be applied over area A1 to produce a boost ratio A1:A3 for high load braking.

It will be understood that, although the invention has been exclusively illustrated and described in relation to an air-actuated servo booster, it can also be applied to hydraulic or power boosters, such as that described, for example, in our British Patents Nos. 2108612 and 2003564, in which actuating force is applied from a force input member to a force output member via a reaction disc in order to provide power assisted output.

Moreover, although the embodiments described herein all incorporate a key 18, 65 for setting the retracted position of the valve piston, alternative means may be employed for this purpose, as will be understood by those skilled in the art. The invention may also be applied to alternative designs of booster which are not provided with the tie rods 11 of the illustrated embodiments.

The invention will be seen to provide an improved booster embodying simple means for changing the boost ratio when heavy braking force is required. The booster of the invention would normally be used in a braking system incorporating an anti-skid facility.

I claim:

1. A brake booster comprising a fluid-actuated servo piston to which the supply of working fluid is controlled by a valve mechanism actuated under the influence of a driver-operated force input member, the input member acting via a force transmission assembly on an output member arranged, in use, to provide power assisted input to a master cylinder, the force transmission assembly including a reaction element and providing surfaces through which force is transmitted between the input and output members and of which operative input and output areas define a boost ratio, and yieldable means arranged to yield under a predetermined transmitted force to permit movement of at least one part of the force transmission assembly in order to cause a change in the ratio of the operative surface areas in a manner to increase the boost ratio.

2. A brake booster according to claim 1, wherein a clearance is provided between parts of the assembly in a force transmission path between the input and output members, such that movement of the at least one assembly part upon yielding of the yieldable means causes a clearance to be taken up and the operative surface areas to change.

3. A brake booster according to claim 1, wherein yielding of the yieldable means permits relative movement between parts of the assembly to change the ratio of the operative surface areas.

4. A brake booster according to claim 3, wherein relative movement of the assembly parts results in a change in the operative input surface area to provide the increase in boost ratio.

5. A brake booster according to claim 1, wherein relative movement between parts of the assembly results in a change in the operative input area from an area of a single component to a composite area including area portions of a plurality of components.

6. A brake booster according to claim 1, wherein the force transmission assembly has portions lying respectively at either side of the reaction element and force is transmitted between the two via the element.

7. A brake booster according to claim 2, wherein the force transmission assembly has portions lying respectively at either side of the reaction element and force is transmitted between the two via the element and the forward one of the transmission assembly portions is a collar surrounding a portion of the output member and urged by the yieldable means towards the other portion so as to be spaced by a clearance from a surface of the output member, such that force is transmitted initially between the input and output members via the reaction element and, upon yielding of the yieldable means to take up the clearance, via both of the transmission assembly portions.

8. A brake booster according to claim 6, or wherein the yieldable means is a coil spring housed within and reacting at one end against a cage secured to the booster servo piston, the other end of the spring engaging the forward one of the transmission assembly portions.

9. A brake booster according to claim 2, wherein the transmission assembly includes two parts which are both disposed at the input side of the reaction element, one of the parts being a collar surround an end portion of the other part so that end faces of the parts act together initially to transmit input force to the reaction element, and, upon yielding of the yieldable means, the collar is moved in the reverse direction to take up the clearance, so that input force is then transmitted to the reaction element by the other part over a different area.

10. A brake booster according to claim 9, wherein the yieldable means is a coil spring surrounding said other part of the transmission assembly and caged between forward and rear abutments carried by said other part, the forward abutment being movable against the force of the spring and engaged by said one of the parts.

11. A brake booster according to claim 2, wherein the output member comprises forward and rear parts contained within and interconnected by a cage fixed to the forward one of the parts, the rear one of the parts being movable relative to the cage and urged against the rear end of the cage by a coil spring serving as the yieldable means which, upon yielding, permits structure movable with the input member to engage the cage and provide an infinite boost ratio.

12. A brake booster according to claim 2, wherein the input member is in longitudinally separate forward and rear parts urged apart by a coil spring serving as the yieldable means and housed within a sleeve surrounding adjacent portions of the two parts and fixed to one of them, yielding of the yieldable means under high input force permitting the forward one of the parts to be moved rearwardly by the reaction element to take up said clearance, enabling the input force to be applied directly by the sleeve to structure movable with the output member to provide an infinite boost ratio.

13. A brake booster according to claim 1, wherein a valve control piston of the valve mechanism forms part of the force transmission assembly and carries a key member arranged to set a rest position of the piston by engagement with fixed structure of the booster.

14. A brake booster according to claim 13, wherein the yieldable means is a blade spring carried by the key member.

15. A brake booster according to claim 13, wherein the yieldable means is a coil spring arranged between a rear face of the key member and an opposing surface of the valve control piston which carries a collar slidably mounted thereon forwardly of the key member, the collar forming part of the force transmission assembly and providing, with the piston, a composite operative force input area until yielding of the coil spring takes place to permit engagement of the collar with a relatively fixed surface to permit the piston to act alone as the force input member having a reduced surface area.

16. A brake booster according to claim 11, wherein the relatively fixed surface is on a separate member carried by a hub of the booster carrying the servo-piston.

17. A brake booster according to claim 13, wherein the yieldable means is a coil spring arranged between a forward face of the key member and an opposing face of a radially extending element carried by the valve control piston and engaging an abutment which is carried by the piston and engaged by the collar, the abutment being permitted sufficient axial movement to enable the collar to move into abutment with the relatively fixed surface upon yielding of the spring in order to change the ratio of the operative surface areas.

* * * * *